US010808851B1

(12) United States Patent
Surjaatmadja et al.

(10) Patent No.: US 10,808,851 B1
(45) Date of Patent: Oct. 20, 2020

(54) MULTI-MATERIAL FRAC VALVE POPPET

(71) Applicant: Halliburton Energy Services, Inc., Houston, TX (US)

(72) Inventors: Jim Basuki Surjaatmadja, Duncan, OK (US); Dick Charles Headrick, Duncan, OK (US); Tim H. Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/436,356

(22) Filed: Jun. 10, 2019

(51) Int. Cl.
*F16K 15/02* (2006.01)
*E21B 41/00* (2006.01)
*F16K 15/06* (2006.01)
*F04B 7/00* (2006.01)
*F04B 15/02* (2006.01)

(52) U.S. Cl.
CPC ............ *F16K 15/028* (2013.01); *E21B 41/00* (2013.01); *F04B 7/0015* (2013.01); *F04B 7/0084* (2013.01); *F04B 15/02* (2013.01); *F16K 15/063* (2013.01)

(58) Field of Classification Search
CPC ...... F16K 15/028; F16K 15/063; F04B 15/02; F04B 7/0084; F04B 7/0015; E21B 41/00; E21B 2034/005
See application file for complete search history.

(56) References Cited

U.S. PATENT DOCUMENTS

| | | |
|---|---|---|
| 2,567,496 A | 9/1951 | Pittenger |
| 3,299,417 A | 1/1967 | Sibthorpe |
| 3,459,363 A | 8/1969 | Miller |
| 3,516,434 A * | 6/1970 | Noss ........................ F16K 17/28 137/514.5 |
| 3,664,371 A | 5/1972 | Schneider |
| 4,257,426 A | 3/1981 | Bailey |
| 4,341,235 A | 7/1982 | Nord |
| 4,477,237 A | 10/1984 | Grable |
| 4,518,329 A * | 5/1985 | Weaver ............... F04B 53/1027 137/516.25 |
| 4,771,801 A | 9/1988 | Crump et al. |
| 4,784,588 A | 11/1988 | Miyashita et al. |
| 4,850,392 A | 7/1989 | Crump et al. |

(Continued)

FOREIGN PATENT DOCUMENTS

| | | |
|---|---|---|
| EP | 0580196 A1 | 1/1994 |
| JP | 2015078838 A | 4/2015 |

(Continued)

OTHER PUBLICATIONS

Filing receipt and specification for patent application entitled "Pump Fluid End with Easy Access Suction Valve," by Justin L Hurst, et al., filed May 14, 2019 as U.S. Appl. No. 16/411,891.

(Continued)

*Primary Examiner* — James G Sayre
(74) *Attorney, Agent, or Firm* — Conley Rose, P.C.; Rodney B. Carroll

(57) ABSTRACT

A valve poppet assembly comprising a valve stem, a poppet insert retainer, and a poppet seat, wherein, in an assembled configuration, the valve stem extends along a central axis through the poppet insert retainer and the poppet seat, and wherein the valve stem, the poppet insert retainer, and the poppet seat are not a single, integral component.

21 Claims, 7 Drawing Sheets

(56) References Cited

U.S. PATENT DOCUMENTS

| | | |
|---|---|---|
| 4,860,995 A | 8/1989 | Rogers |
| 4,939,923 A | 7/1990 | Sharp |
| 5,040,408 A | 8/1991 | Webb |
| 5,072,622 A | 12/1991 | Roach et al. |
| 5,073,096 A | 12/1991 | King et al. |
| 5,176,025 A | 1/1993 | Butts |
| 5,226,445 A | 7/1993 | Suijaatmadja |
| 5,297,896 A | 3/1994 | Webb |
| 5,343,738 A | 9/1994 | Skaggs |
| 5,403,168 A | 4/1995 | Evenson |
| 5,720,325 A | 2/1998 | Grantham |
| 5,775,842 A | 7/1998 | Osborne |
| 5,924,853 A | 7/1999 | Pacht |
| 6,032,699 A | 3/2000 | Grantham |
| 6,082,392 A | 7/2000 | Watkins, Jr. |
| 6,164,188 A | 12/2000 | Miser |
| 6,270,327 B1 | 8/2001 | Wolz et al. |
| 6,342,272 B1 | 1/2002 | Halliwell |
| 6,607,010 B1 | 8/2003 | Kashy |
| 6,935,161 B2 | 8/2005 | Hutchinson |
| 7,798,165 B2 | 9/2010 | McClung, Jr. |
| 8,234,911 B2 | 8/2012 | Jax |
| 8,366,408 B2 | 2/2013 | Wago et al. |
| 8,418,363 B2 | 4/2013 | Patel |
| 8,506,262 B2 | 8/2013 | Leugemors et al. |
| 8,550,102 B2 | 10/2013 | Small |
| 8,590,614 B2 | 11/2013 | Surjaatmadja et al. |
| 9,499,895 B2 | 11/2016 | Langan et al. |
| 9,528,508 B2 | 12/2016 | Thomeer et al. |
| 9,617,654 B2 | 4/2017 | Rajagopalan et al. |
| 9,822,894 B2 | 11/2017 | Bayyouk et al. |
| 2002/0073840 A1 | 6/2002 | Pippert |
| 2007/0044848 A1 | 3/2007 | Norman |
| 2007/0267076 A1 | 11/2007 | Strauss et al. |
| 2008/0011057 A1 | 1/2008 | Spaolonzi et al. |
| 2009/0041588 A1 | 2/2009 | Hunter et al. |
| 2009/0041596 A1 | 2/2009 | Ponomarev et al. |
| 2009/0159133 A1 | 6/2009 | Popke et al. |
| 2009/0194174 A1 | 8/2009 | Morgan et al. |
| 2009/0278069 A1* | 11/2009 | Blanco .......... F16K 15/063 251/309 |
| 2010/0038070 A1 | 2/2010 | Blanco et al. |
| 2010/0098568 A1 | 4/2010 | Marica |
| 2010/0126250 A1 | 5/2010 | Jax |
| 2011/0180740 A1 | 7/2011 | Marica |
| 2012/0148431 A1 | 6/2012 | Gabriel |
| 2012/0223267 A1 | 9/2012 | Marica |
| 2012/0234539 A1 | 9/2012 | Brunet et al. |
| 2012/0279721 A1 | 11/2012 | Surjaatmadja et al. |
| 2012/0312402 A1 | 12/2012 | Tyler |
| 2013/0061942 A1 | 3/2013 | Hulsey |
| 2013/0319220 A1 | 12/2013 | Lahuraka et al. |
| 2014/0064996 A1 | 3/2014 | Arima |
| 2014/0150889 A1 | 6/2014 | Ragner |
| 2014/0261790 A1 | 9/2014 | Marica |
| 2014/0264133 A1* | 9/2014 | Johnson .......... F04B 53/108 251/356 |
| 2014/0312257 A1 | 10/2014 | Marica |
| 2014/0328701 A1 | 11/2014 | Nathan |
| 2014/0348677 A1 | 11/2014 | Moeller et al. |
| 2015/0132157 A1 | 5/2015 | Whaley et al. |
| 2016/0131264 A1 | 5/2016 | Bregazzi et al. |
| 2016/0215588 A1 | 7/2016 | Belshan et al. |
| 2017/0037847 A1 | 2/2017 | Johnson et al. |
| 2018/0058431 A1 | 3/2018 | Blume |
| 2018/0058444 A1* | 3/2018 | Blume .......... F04B 53/1087 |
| 2018/0298894 A1 | 10/2018 | Wagner et al. |
| 2019/0120389 A1* | 4/2019 | Foster .......... F16K 1/443 |
| 2019/0154035 A1 | 5/2019 | Cordes et al. |
| 2019/0226475 A1* | 7/2019 | Stark .......... F04B 53/1087 |

FOREIGN PATENT DOCUMENTS

| | | |
|---|---|---|
| WO | 2011103551 A1 | 8/2011 |
| WO | 20150077001 A1 | 5/2015 |

OTHER PUBLICATIONS

Filing receipt and specification for patent application entitled "Easy Change Pump Plunger," by Justin L. Hurst, et al., filed May 14, 2019 as U.S. Appl. No. 16/411,894.

Filing receipt and specification for patent application entitled "Pump Valve Seat with Supplemental Retention," by Justin L. Hurst, et al., filed May 14, 2019 as U.S. Appl. No. 16/411,898.

Filing receipt and specification for patent application entitled "Flexible Manifold for Reciprocating Pump," by Joseph A. Beisel, et al., filed May 14, 2019 as U.S. Appl. No. 16/411,901.

Filing receipt and specification for patent application entitled "Valve Assembly for a Fluid End with Limited Access," by Justin L. Hurst, et al., filed May 14, 2019 as U.S. Appl. No. 16/411,910.

Filing receipt and specification for patent application entitled "Pump Plunger with Wrench Features," by Justin L. Hurst, et al., filed May 14, 2019 as U.S. Appl. No. 16/411,905.

Filing receipt and specification for patent application entitled "Pump Fluid End with Suction Valve Closure Assist", by Justin L. Hurst, et al., filed Jun. 10, 2019 as U.S. Appl. No. 16/436,312.

Filing receipt and specification for patent application entitled "Multi-Layer Coating for Plunger and/or Packing Sleeve," by Justin L. Hurst, et al., filed Jun. 10, 2019 as U.S. Appl. No. 16/436,389.

Acknowledgement receipt and specification for International application entitled "Multi-Layer Coating for Plunger and/or Packing Sleeve," by Justin L. Hurst, et al., filed Jun. 12, 2019 as International application No. PCT/US2019/036785.

Filing receipt and specification for patent application entitled "Pump Fluid End with Positional Indifference for Maintenance," by Justin L. Hurst, et al., filed May 14, 2019 as U.S. Appl. No. 16/411,911.

Acknowledgement receipt and specification for patent application entitled, "Oil Field Pumps with Reduced Maintenance," by Jim B. Surjaatmadja, et al., filed Jul. 26, 2019 as U.S. Appl. No. 16/522,860.

Acknowledgement receipt and specification for patent application entitled, "Fail Safe Suction Hose for Significantly Moving Suction Port," by Jim B. Surjaatmadja, et al., filed Jul. 26, 2019 as U.S. Appl. No. 16/522,874.

Acknowledgement receipt and specification for International application entitled "Oil Field Pumps with Reduced Maintenance," by Jim B. Surjaatmadja, et al., filed Jul. 30, 2019 as International application No. PCT/US2019/044191.

Acknowledgement receipt and specification for International application entitled "Fail Safe Suction Hose for Significantly Moving Suction Port," by Jim B. Surjaatmadja, et al., filed Jul. 30, 2019 as International application No. PCT/US2019/044194.

Filing Receipt and Specification for patent application entitled "Flexible Manifold for Reciprocating Pump," by Joseph A. Beisel, et al., filed Oct. 7, 2019 as U.S. Appl. No. 16/594,825.

Office Action (Restriction Requirement) dated Aug. 28, 2019, (7 pages), U.S. Appl. No. 16/522,874, filed Jul. 26, 2019.

Office Action dated Oct. 22, 2019 (27 pages), U.S. Appl. No. 16/522,874, filed Jul. 26, 2019.

Scully Intellicheck2, Complete Overfill Prevention and Retained Product Monitoring System, 67293 Rev B, Oct., 2013, 2 pages.

Scully Intellicheck2, Complete Overfill Prevention and Retained Product Monitoring System, 67293 Rev B, May 2014, 2 pages.

Scully Intellicheck3, Complete Overfill Prevention and Retained Product Monitoring System, XXXXX Rev A, Jun. 2016, 2 pages.

Foreign Communication from Related Application—International Search Report and Written Opinion of the International Searching Authority, International Application No. PCT/US2019/036785, dated Mar. 5, 2020, 13 pages.

Foreign Communication from Related Application—International Search Report and Written Opinion of the International Searching Authority, International Application No. PCT/US2019/044194, dated Apr. 23, 2020, 12 pages.

(56) References Cited

OTHER PUBLICATIONS

Communication from Related Foreign Application—International Search Report and Written Opinion of the Internationa Application No. PCT/US2019/044191, dated Apr. 24, 2020, 13 pages.
Notice of Allowance and Fee(s) Due dated Jan. 28, 2020 (14 pages), U.S. Appl. No. 16/522,874, filed Jul. 26, 2019.
Foreign Communication from Related Application—International Search Report and Written Opinion of the International Searching Authority, International Application No. PCT/US2020/022073, dated Jul. 3, 2020, 12 pages.

* cited by examiner

MULTI-MATERIAL FRAC VALVE POPPET

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to a method and apparatus for supplying pressurized fluids. More particularly, the present disclosure relates to methods and reciprocating devices for pumping fluids into a wellbore.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern lifetime and reliability of pump fluid end components, as reciprocating pumps used in wellbore operations, for example, often encounter high cyclical pressures and various other conditions that can render pump components susceptible to wear and result in a need for servicing and maintenance of the pump.

Accordingly, it is desirable to provide a valve poppet assembly that enhances a lifetime and/or reliability of a valve assembly comprising same.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
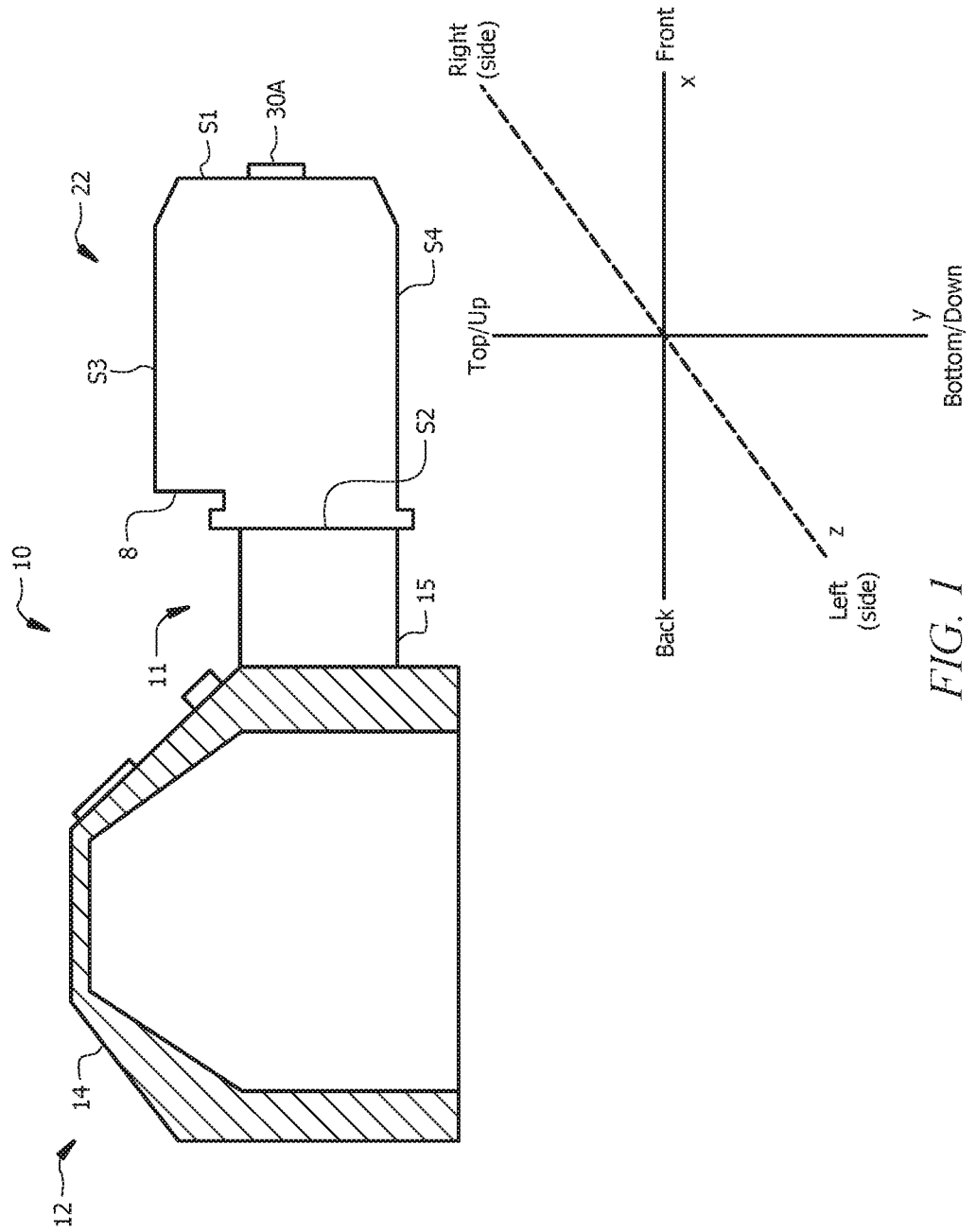
FIG. 1 is an elevational view of a reciprocating pump, according to embodiments of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a reciprocating apparatus for pumping pressurized fluid. In embodiments, the reciprocating apparatus comprises a pump fluid end having a valve poppet assembly comprising a valve stem, a poppet insert retainer, and a poppet seat. In embodiments, the valve poppet assembly further comprises a poppet insert (also sometimes referred to herein simply as an "insert"). As known to those of skill in the art, a poppet insert can be utilized to help create a sufficiently good seal. The valve stem, the poppet insert retainer, and the poppet seat of the valve poppet assembly are not a single, integral component. In embodiments, at least two of the valve poppet assembly components (e.g., the valve stem, the poppet insert retainer, and the poppet seat) are not integrated, and thus are separable. As utilized herein, "integrated" means "comprise a single integral component" and "not integrated" indicates "do not comprise a single integral component." As utilized herein, integrated components are thus not distinct, disparate components, separable from each other, for example, by unthreading, while components that are not integrated are distinct, disparate components that are easily separable from each other, for example, via unthreading. For example, in embodiments, the valve stem is not integrated with the poppet seat, and thus the valve stem can be separated from (at least) the poppet seat. In embodiments, the valve stem is not integrated with the poppet insert retainer, and thus the valve stem can be separated from (at least) the poppet insert retainer. In embodiments, the poppet seat is not integrated with the poppet insert retainer, and thus the poppet seat can be separated from (at least) the poppet insert retainer. In embodiments, all three of the components of the valve poppet assembly (i.e., the poppet seat, the poppet insert retainer, and the valve stem) are not integrated, such that the poppet seat can be separated from the poppet insert retainer, and the poppet insert retainer can be separated from the valve stem.

In an assembled configuration of the valve poppet assembly, the valve stem extends along a central axis through the poppet insert retainer and the poppet seat, a valve stem contact surface of the poppet seat contacts a poppet seat contact surface of the valve stem, a poppet insert retainer contact surface of the poppet seat contacts a poppet seat contact surface of the poppet insert retainer, and a valve stem contact surface of the poppet insert retainer contacts a poppet insert retainer contact surface of the valve stem. Such a valve poppet assembly design can provide for an enhanced lifetime and/or reliability of a valve assembly comprising the valve poppet assembly, for example, by enabling the use of disparate base materials and/or surface treatments for one or more of the valve poppet assembly components (e.g., for one or more component selected from the valve stem, the poppet seat, and the poppet insert retainer).

By way of non-limiting example, in embodiments, at least one of the valve poppet assembly components selected from the valve stem, the poppet insert retainer, and the poppet seat can be made of a different base material than at least one other component of the valve poppet assembly. As utilized herein, a "base" material is a material from which the component is made. For example and without limitation, in embodiments, a poppet seat can comprise one or more carbides as base material, while a valve stem can comprise regular steel, providing the poppet seat with a harder base material than the valve stem. Alternatively or additionally, the design of a valve poppet assembly as disclosed herein comprising at least two separable/not integrated components enables the use of a disparate surface treatment for one or more of the valve poppet assembly components (e.g., for one or more components selected from the group consisting of the valve stem, the poppet seat, and the poppet insert retainer). For example, at least one of the valve poppet assembly components selected from the group consisting of the valve stem, the poppet insert retainer, and the poppet seat can be independently subjected to a surface treatment, such as carburization, while at least one other component of the valve poppet assembly can be subjected to a disparate surface treatment or to no surface treatment at all. For example and without limitation, in embodiments, the poppet seat can be subjected to carburization surface treatment, while the valve stem can not be subjected to a carburization surface treatment. In embodiments, the reciprocating apparatus is a high-pressure pump configured to operate at a pressure greater than or equal to about 3,000 psi and/or in a well servicing operation and environment.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the z-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2A:
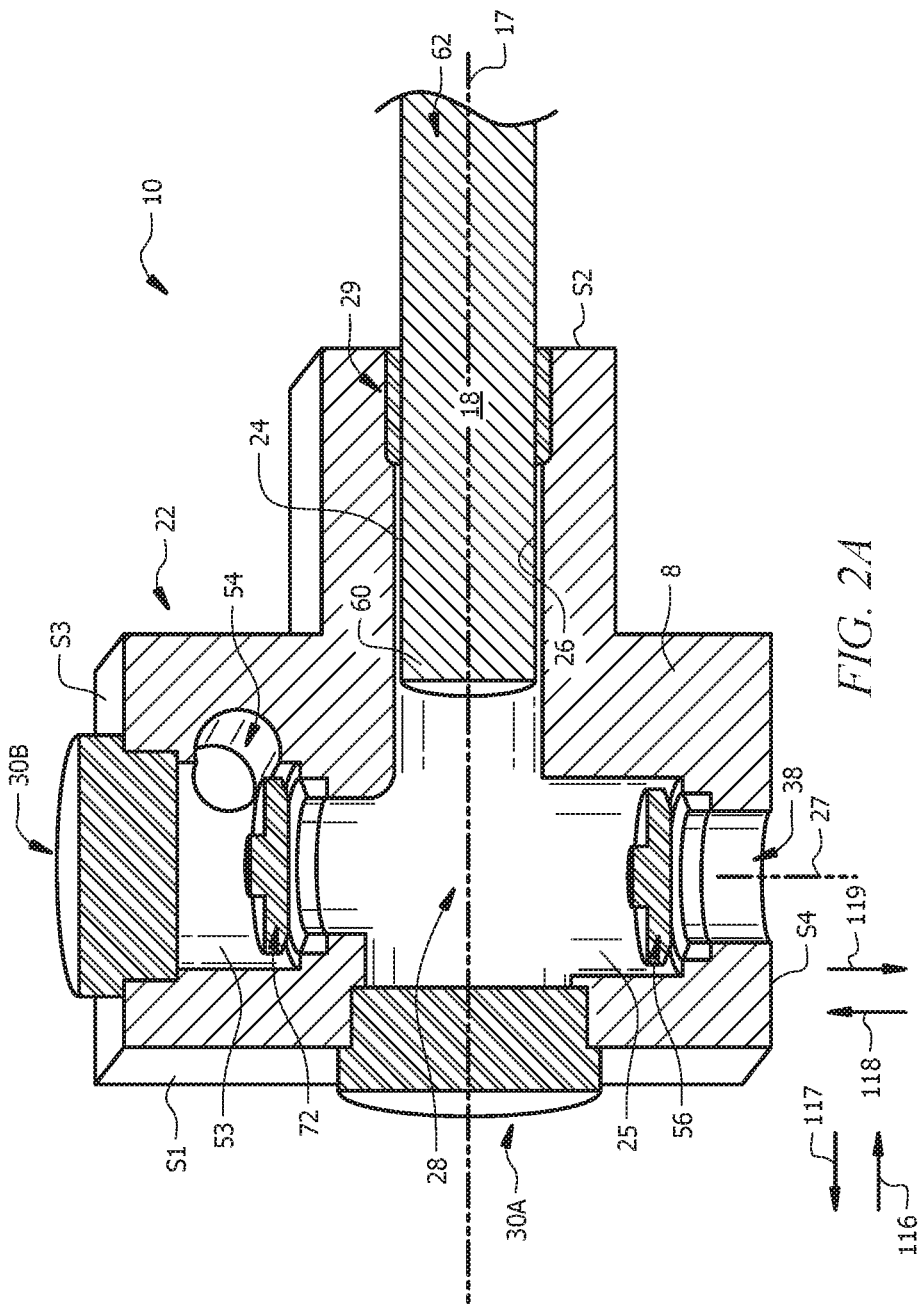
FIG. 2A is a cut-away illustration of an exemplary reciprocating pump comprising a cross-bore pump fluid end, according to embodiments of the present disclosure.
Figure 2B:
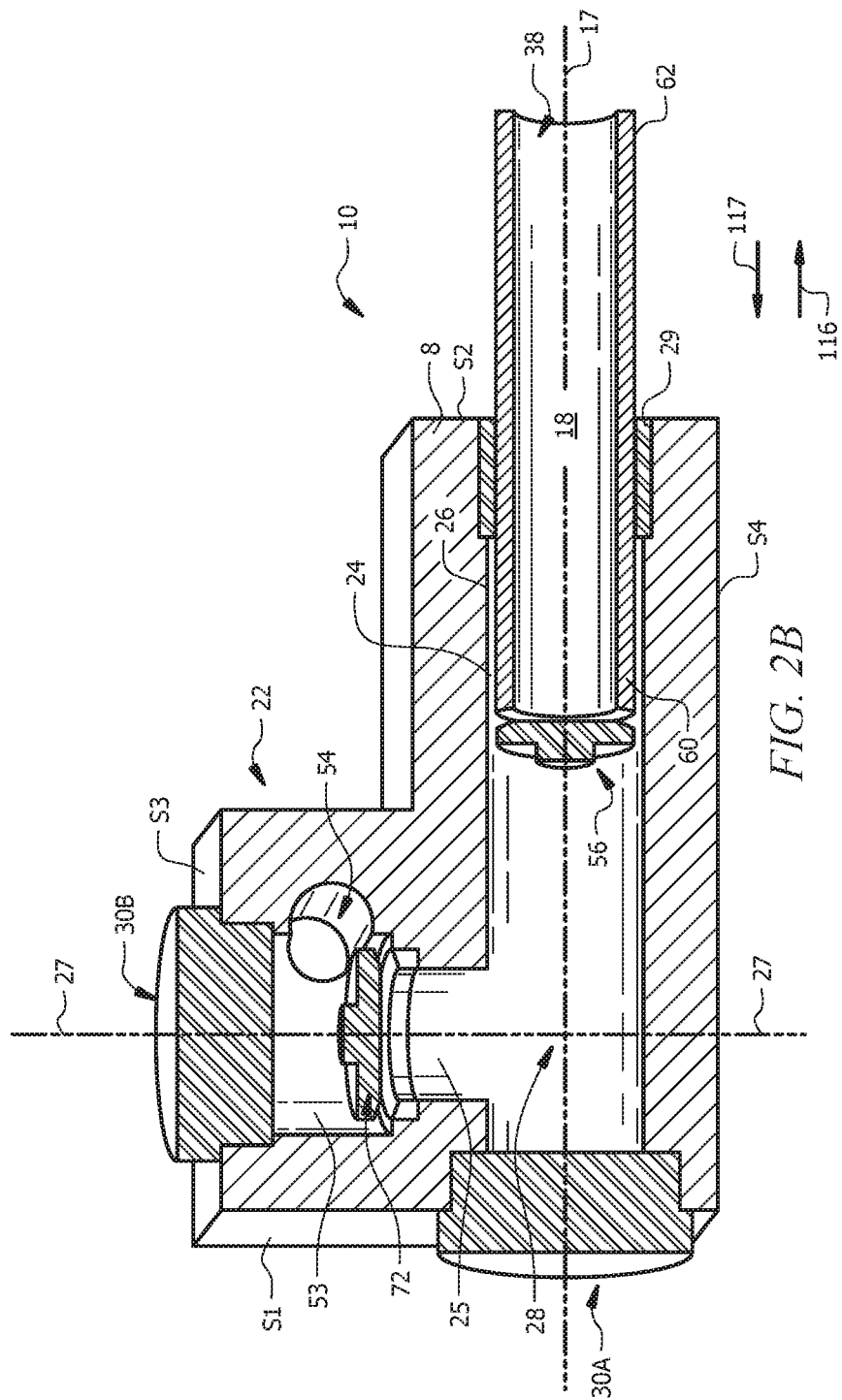
FIG. 2B is a cut-away illustration of an exemplary reciprocating pump comprising a cross-bore pump fluid end, according to other embodiments of the present disclosure.
Figure 3:
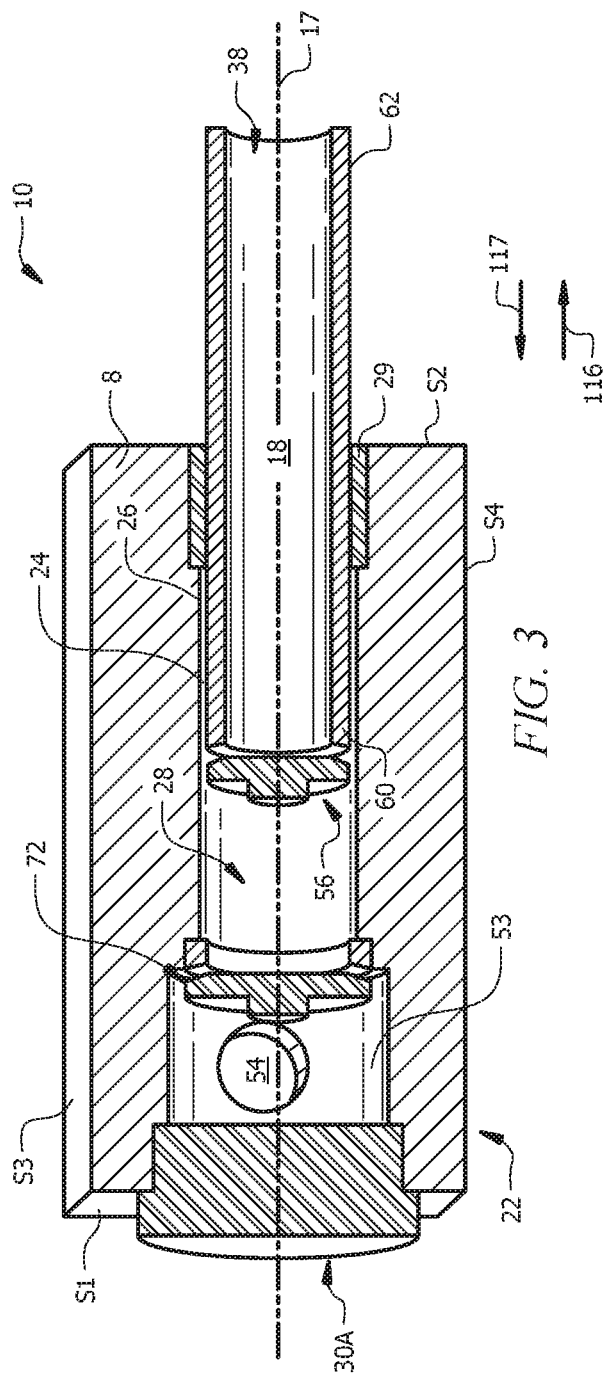
FIG. 3 is a cut-away illustration of an exemplary reciprocating pump comprising a concentric bore pump fluid end, according to embodiments of the present disclosure.

The pump fluid end 22 is integrated with the pump power end 12 via the integration section 11, such that pump power end 12 is operable to reciprocate the reciprocating element 18 within a reciprocating element bore 24 (FIGS. 2-3) of the pump fluid end 22. The reciprocating element bore 24 is at least partially defined by a cylinder wall 26. As described further hereinbelow with reference to FIGS. 2A-2B and FIG. 3, pump fluid end 22 can be a multi-bore pump fluid end (also referred to herein as a cross-bore pump fluid end) 22 or, alternatively, an in-line or "concentric" bore pump fluid end. As utilized herein, multi-bore pump fluid ends can comprise "T-bore" pump fluid ends, "X-bore" (e.g., cross shaped bore) pump fluid ends, or "Y-bore" pump fluid ends. FIG. 2A is a schematic showing a cross-bore pump fluid end 22 engaged with a reciprocating element 18, wherein the cross-bore pump fluid end 22 comprises a cross-bore 25 that makes a cross shape (+) relative to reciprocating element bore 24. FIG. 2B is a schematic showing a cross-bore pump fluid end 22 engaged with a reciprocating element 18, wherein the cross bore pump fluid end 22 comprises a tee-bore 25 that makes a "T" shape relative to reciprocating element bore 24. FIG. 3 is a schematic showing a concentric bore pump fluid end 22 engaged with a reciprocating element 18. As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 4:
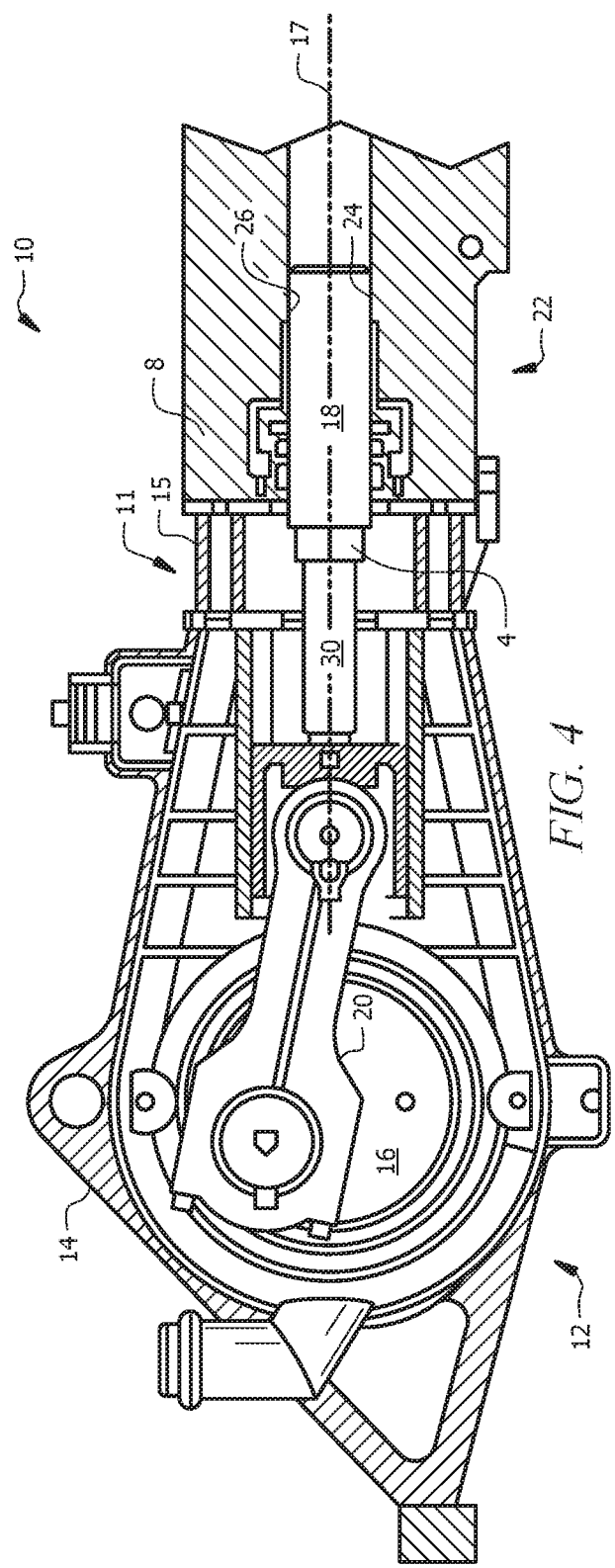
FIG. 4 is cut-away illustration of a pump power end of a pump, according to embodiments of the present disclosure.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 4 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm/connecting rod 20. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm/connecting rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", and not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIGS. 2A-2B and FIG. 3. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1, indicated by arrow 117) and return strokes (also referred to as suction strokes and correlating to movement in a negative direction parallel to the x-axis of FIG. 1, indicated by arrow 116), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. (As utilized here, "high pressure" indicates possible subjection to high pressure during discharge.) When discharge valve assembly 72 is in a closed configuration (e.g., under the influence of a closing mechanism, such as a spring), the high pressure in a discharge pipe or manifold containing discharge outlet 54 prevents fluid flow into discharge chamber 53 and causes pressure in the pump chamber 28 to accumulate upon stroking of the reciprocating element 18. When the reciprocating element 18 begins the forward stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body (e.g., a movable poppet) and a valve seat thereof) and a configuration in which fluid cannot flow through the valve assembly (e.g., cannot pass between a valve body (e.g., a movable poppet) and a valve seat thereof). As the reciprocating element 18 extends forward, fluid within the pump chamber 28 is discharged through the discharge outlet 54.

During a return stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiments of FIG. 2A, which is a schematic showing a cross-bore pump fluid end 22 engaged with a reciprocating element 18, cross-bore pump fluid end 22 comprises a cross-bore fluid end body 8, a cross-bore pump chamber 28, a suction valve assembly 56, and a discharge valve assembly 72. In this cross-bore configuration, suction valve assembly 56 and discharge valve assembly 72 are located in a bore or channel 25 (also referred to herein as a cross bore 25) of pump chamber 28, wherein bore 25 has a central axis 27 that is parallel to the y-axis of FIG. 1 and is perpendicular to bore 24 in which reciprocating element 18 reciprocates during operation. Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12

(as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 2B, which is a schematic showing a T-bore pump fluid end 22 engaged with a reciprocating element 18, T-bore pump fluid end 22 comprises a T-bore fluid end body 8, a T-shaped pump chamber 28, a suction valve assembly 56, and a discharge valve assembly 72. In this T-bore configuration of FIG. 2B, suction valve assembly 56 is coupled with front end 60 of reciprocating element 18 and discharge valve assembly 72 is positioned in bore 25 that makes a tee with reciprocating element bore 24, i.e., central axis 17 of reciprocating element bore 24 is also the central axis of suction pump assembly 56 and perpendicular to a central axis 27 of discharge valve assembly 72 (i.e., central axis 27 is parallel to the y-axis of FIG. 1 and is perpendicular to bore 24 in which reciprocating element 18 reciprocates during operation). Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 3, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). Suction valve assembly 56 and discharge valve assembly 72 are operable to direct fluid flow within the pump 10. In some concentric bore fluid end designs, fluid flows within a hollow reciprocating element (e.g., a hollow plunger) 18. In some such embodiments, the reciprocating element bore 24 of such a concentric bore fluid end design can be defined by a high pressure cylinder 26 providing a high pressure chamber and a low pressure cylinder (not depicted in the embodiment of FIG. 3) providing a low pressure chamber toward tail end 62 of reciprocating element 18, whereby fluid from fluid inlet 38 enters reciprocating element 18. When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a concentric bore pump fluid end 22 design, the fluid inlet can be configured to introduce fluid into pump chamber 28 via a reciprocating element 18 that is hollow and/or via a low pressure chamber as described above. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. For example, with reference to the cross-bore fluid end body 8 embodiments of FIG. 2A and FIG. 2B, a front access port 30A can be located on a front S1 of the pump fluid end 22 opposite a back S2 of the pump fluid end 22, wherein the back S2 of the pump fluid end is proximal the pump power end 12, upon integration therewith via integration section 11. A top access port 30B can be located on a top S3 of the pump fluid end 22 opposite a bottom S4 of the pump fluid end 22, wherein the top S1 of the pump fluid end 22 is above central axis 17 and the bottom S4 of the pump fluid end 22 is below central axis 17. With reference to the concentric fluid end body 8 embodiment of FIG. 3, a front access port 30A can be located on a front S1 of the pump fluid end 22 opposite a back S2 of the pump fluid end 22, wherein the back S2 of the pump fluid end is proximal the pump power end 12, upon integration therewith via integration section 11. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port located on a side of the discharge valve assembly 72 opposite the suction valve assembly 56. For example, in the cross-bore pump fluid end 22 embodiment of FIG. 2A, top access port 30B is located on a side (e.g., top side) of discharge valve assembly 72 opposite suction valve assembly 56, while in the concentric bore pump fluid end 22 embodiment of FIG. 3, front access port 30A is located on a side (e.g., front side) of discharge valve assembly 72 opposite suction valve assembly 56.

In embodiments, one or more seals 29 (e.g., "o-ring" seals, packing seals, or the like), also referred to herein as 'primary' reciprocating element packing 29 (or "packing 29") may be arranged around the reciprocating element 18 to provide sealing between the outer walls of the reciprocating element 18 and the inner walls 26 defining at least a portion of the reciprocating element bore 24. The inner walls 26 may be provided by fluid end body 8 or a sleeve within reciprocating element bore 24, as described below. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). In embodiments, only a primary reciprocating element packing is utilized, as fluid enters tail end 62 of reciprocating element 18 without first contacting an outer peripheral wall thereof (i.e., no secondary reciprocating element packing is needed/utilized, because no low pressure chamber external to reciprocating element 18 is utilized). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24 (optionally, within a sleeve, as described hereinbelow). In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged, machined, printed or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("oversleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit (e.g., interference fit) into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 4 (FIG. 4; e.g., clamps, adapters, extensions, etc.) may be used to couple the reciprocating element 18 to the pump power end 12 (e.g., to a pushrod 30).

In some embodiments (e.g., cross-bore pump fluid end 22 embodiments such as FIG. 2A), the reciprocating element may be substantially solid and/or impermeable (e.g., not hollow). In alternative embodiments (e.g., tee-bore pump fluid end 22 embodiment such as FIG. 2B and concentric bore pump fluid end 22 embodiment such as FIG. 3), the reciprocating element 18 comprises a peripheral wall defining a hollow body. Additionally (e.g., tee-bore pump fluid end 22 embodiments such as FIG. 2B and concentric bore pump fluid end 22 embodiments such as FIG. 3), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end 12, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 3, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within the bore 25 below central axis 17 of the pump fluid end 22, in cross-bore pump fluid end 22 designs such as FIG. 2A, such that a suction valve body (e.g., a poppet assembly) of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration. The suction valve assembly 56 may be disposed within reciprocating element bore 24 and at least partially within reciprocating element 18 in tee-bore pump fluid end 22 designs such as FIG. 2B and concentric bore pump fluid end 22 designs such as FIG. 3, such that a suction valve body (e.g., a poppet assembly) of the suction valve assembly 56 moves away from a suction valve seat within and/or coupled with a suction valve seat housing of reciprocating element 18 when the suction valve assembly 56 approaches an open configuration (i.e., is opening) and toward the suction valve seat when the suction valve assembly 56 approaches a closed configuration (i.e., is closing).

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed within the bore 25 proximal the top S3 of the pump fluid end 22, in cross-bore pump fluid end 22 designs such as FIG. 2A and tee-bore pump fluid end 22 designs such as FIG. 2B, such that a discharge valve body (e.g., a poppet assembly) of the discharge valve assembly 72 moves toward the discharge chamber 53 when the discharge valve assembly 72 approaches an open configuration and away from the discharge chamber 53 when the discharge valve assembly 72 approaches a closed configuration. The discharge valve assembly 72 may be disposed proximal the front S1 of bore 24 of the pump fluid end 22 (e.g., at least partially within discharge chamber 53 and/or pump chamber 28) in concentric bore pump fluid end 22 designs such as FIG. 3, such that a discharge valve body (e.g., poppet assembly) of the discharge valve assembly 72 moves toward the discharge chamber 53 when the discharge valve assembly 72 approaches an open configuration and away from the discharge chamber 53 when the discharge valve assembly 72 approaches a closed configuration. In addition, the discharge valve assembly 72 may be co-axially aligned with the suction valve assembly 56 (e.g., along central axis 17 in concentric bore pump fluid end 22 configurations such as FIG. 3 or along central axis 27 of bore 25 perpendicular to central axis 17 in cross-bore pump fluid end 22 configurations such as FIG. 2A and FIG. 2B). In concentric bore pump fluid end 22 configurations such as FIG. 3, the suction valve assembly 56 and the discharge valve assembly 72 may be coaxially aligned with the reciprocating element 18 (e.g., along central axis 17).

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, valve guides, poppets, etc.) and/or components may be employed for retaining the components of the suction valve assembly 56 and the components of the discharge valve assembly 72 within the pump fluid end 22. According to this disclosure, the discharge valve assembly 72 and/or the suction valve assembly 56 comprises a valve poppet assembly as described hereinbelow.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms/connecting rods 20, one or more additional components or mechanical linkages 4, pushrods 30, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2A-2B and FIG. 3) forward in its cylinder. A top dead center position corresponds to the position of a fully extended reciprocating element at zero velocity, e.g., just prior to a reciprocating element moving backward (i.e., in a direction indicated by arrow 116 in FIGS. 2A-2B and FIG. 3) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Figure 5:
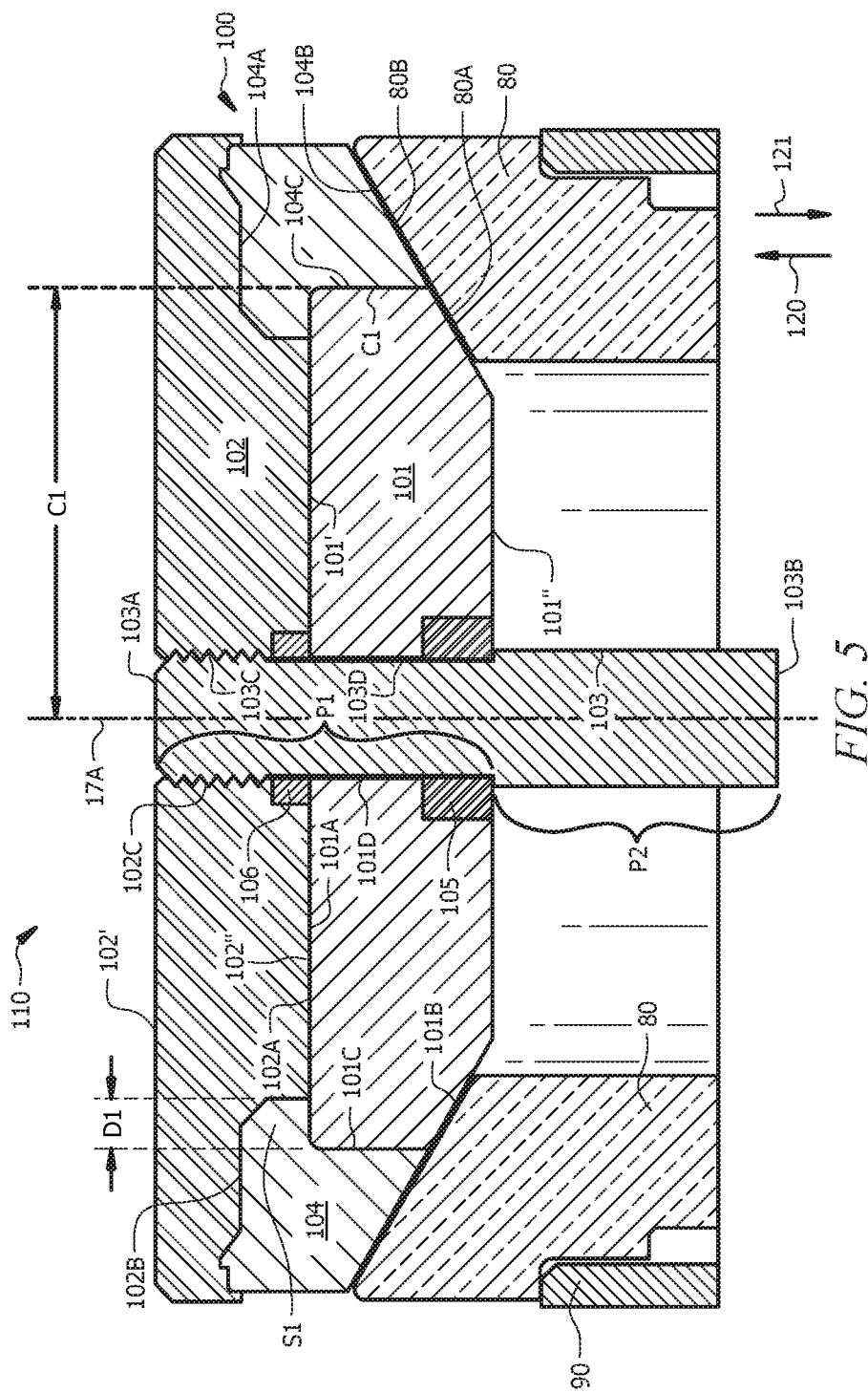
FIG. 5 is a schematic of a valve assembly, according to embodiments of the present disclosure.

FIG. 5 is a schematic of a valve assembly 110 comprising a (e.g., movable) valve poppet assembly 100 and a valve seat 80, according to embodiments of the present disclosure. According to this disclosure, and as described further hereinbelow, a valve poppet assembly 100 comprises a poppet seat 101, a poppet insert retainer 102, and a valve stem 103. According to this disclosure, the poppet seat 101, the poppet insert retainer 102, and the valve stem 103 are not a single, integral component. The poppet seat 101, the poppet insert retainer 102, and the valve stem 103 can be cylindrical, in embodiments.

In an assembled configuration of valve poppet assembly 100, the valve stem 103 extends along a central axis 17A of valve stem 103 through a center of the poppet insert retainer 102 and the poppet seat 101, such that a front end 103A of valve stem 103 extends at least a portion of the way through poppet insert retainer 102 and a back end 103B of valve stem 103 extends at least a portion of the way through poppet seat 101. In embodiments, front end 103A of valve stem 103 extends along central axis 17A in a direction indicated by arrow 120 greater than or equal to a distance along central axis 17A in direction 120 to which poppet insert retainer 102 extends. In embodiments, back end 103B of valve stem 103 extends along central axis 17A in a direction indicated by arrow 121 greater than or equal to a distance along central axis 17A in direction 121 to which poppet seat 101 extends. For example, in embodiments, such as depicted in FIG. 5, when valve poppet assembly 100 is assembled into valve assembly 110, valve stem 103 passes through at least a portion of valve seat 80 along central axis 17A.

In the assembled configuration of valve poppet assembly 100, a valve stem contact surface 101D of the poppet seat 101 contacts a poppet seat contact surface 103D of the valve stem 103, a poppet insert retainer contact surface 101A of the poppet seat 101 contacts a poppet seat contact surface 102A of the poppet insert retainer 102, and a valve stem contact surface 102C of the poppet insert retainer 102 contacts a poppet insert retainer contact surface 103C of the valve stem 103.

In embodiments, the valve stem 103 and the poppet insert retainer 102 are a single integral component, separable from the poppet seat 101. In embodiments, the valve stem 103 and the poppet seat 101 are a single integral component, separable from the poppet insert retainer 102. In embodiments, the poppet seat 101 and the poppet insert retainer 102 are a single integral component, separable from the valve stem 103. In embodiments, the poppet seat 101, the poppet insert retainer 102, and the valve stem 103 are all separable from each other.

In embodiments, at least two components selected from the group consisting of the valve stem 103, the poppet insert retainer 102, and the poppet seat 101 comprise, consist, or consist essentially of a disparate base material. Base materials can be selected from carbides, steel, elastomers, or a combination thereof. In embodiments, at least one component selected from the group consisting of the valve stem 103, the poppet insert retainer 102, and the poppet seat 101 comprises a carbide base material. In embodiments, at least one other component selected from the group consisting of the valve stem 103, the poppet insert retainer 102, and the poppet seat 101 does not comprise carbide base material. In embodiments, the at least one component selected from the group consisting of the valve stem 103, the poppet insert retainer 102, and the poppet seat 101 that comprises carbide is the poppet seat 101. In embodiments, at least one (e.g., other) component selected from the group consisting of the valve stem 103, the poppet insert retainer 102, and the poppet seat 101 comprises steel. In embodiments, the at least one other component selected from the group consisting of the valve stem 103, the poppet insert retainer 102, and the poppet seat 101 that comprises steel is the valve stem 103. In embodiments, poppet seat 101 comprises a base material selected from carbides, carburized steel, ceramics, nickel chrome steel, or a combination thereof. In embodiments, poppet seat 101 comprises a base material selected from nickel carbide, boride, chrome, or a combination thereof. In embodiments, poppet insert retainer 102 comprises a base material selected from carbides, carbon steel, alloy steels, or a combination thereof. In embodiments, valve stem 103 comprises a base material selected from carbides, carbon steels, alloy steels, or a combination thereof.

In embodiments, at least two components selected from the group consisting of the valve stem 103, the poppet insert retainer 102, and the poppet seat 101 comprise a disparate surface material. As utilized herein, a "surface" material is a material on an outside surface of a component. A surface material may be deposited on a substrate surface by techniques such as chemical or physical vapor deposition, and/or a surface material may be formed on a substrate surface by treating the substrate surface by techniques such as electroless nickel, or electro deposited nickel or other material of choice; cladding with hard materials, etc. For example, a component that comprises regular steel as a base material can undergo a surface treatment comprising carburization, such that the surface treated component comprises a surface material comprising carburized steel. As utilized herein, 'regular' steel indicates steel that has not been subjected to a surface treatment (e.g., a non-carburized steel). In embodiments, at least one component (e.g., a first component) selected from the group consisting of the valve stem 103, the poppet insert retainer 102, and the poppet seat 101 comprises a carburized surface. In some such embodiments, at least one other component (e.g., a second component) selected from the group consisting of the valve stem 103, the poppet insert retainer 102, and the poppet seat 101 does not comprise a carburized surface and/or has not been integrated with a component of the valve poppet assembly when that component (e.g., the first component) has been subjected to carburization. In embodiments, the at least one component (e.g., the first component) selected from the group consisting of the valve stem 103, the poppet insert retainer 102, and the poppet seat 101 that comprises the carburized surface is the poppet seat 101. In embodiments, at least one other component (e.g., the second component) selected from the group consisting of the valve stem 103, the poppet insert retainer 102, and the poppet seat 101 comprises (e.g., regular) steel. In embodiments, the at least one other component (e.g., the second component) selected from the group consisting of the valve stem 103, the poppet insert retainer 102, and the poppet seat 101 that comprises (e.g., regular) steel is the valve stem 103. In embodiments, the valve stem 103 (e.g., regular steel valve stem 101) and/or the valve insert retainer 102 (e.g., regular steel valve insert retainer 102) have a hardness or strength, as measured by commonly known methods; that is less than a hardness or strength of the poppet seat 101 (e.g., carburized poppet seat 101). The enhanced hardness of the poppet seat 101 can be due to the fact that the poppet seat 101 comprises a harder base material such as carbides and/or a harder surface material (e.g., carburized).

A valve poppet assembly 100 of this disclosure can further comprise a poppet insert 104 (also referred to herein simply as an "insert" 104) positioned along an outside circumference C1 of the poppet seat 101 and extending a distance D1 between a front surface 101' of the poppet seat 101 and a back surface 102" of the poppet insert retainer 102. Poppet insert contact surface 101C of poppet seat 101 can comprise all or a portion of outside circumference C1 of poppet seat 101. Poppet insert 104 are designed to eliminate or reduce leakage of fluids. In embodiments, the poppet insert 104 comprises an elastomeric material. In embodiments, the poppet insert comprises a non-stretchable material, such as, without limitation, one or more metals and/or a fiber reinforced material.

In embodiments, the poppet insert retainer 102 is separable from the poppet seat 101 and/or the valve stem 103, such that the poppet insert retainer 102 can be removed from the valve poppet assembly 100 separately from the poppet seat 101 and/or the valve stem 103. Such a design may facilitate (e.g., make easier) access to the poppet insert 104, in embodiments, for example to provide for maintenance and/or replacement of poppet insert 104. In embodiments in which the poppet insert retainer 102 is not separable from the poppet seat 101 (e.g., as in conventional one piece poppet assemblies), an (e.g., elastomeric) insert 104 can be stretched past the poppet seat 101, and then hammered into the gap (e.g., shoulder S1) for proper seating. Providing a separable poppet seat 101 from the poppet insert retainer 102, as per embodiments of this disclosure, can be utilized when the poppet insert 104 is made from harder materials (e.g., fiber reinforced plastics or elastomers), or when the poppet insert 104 is made from soft metals (e.g., without limitation, soft stainless steels, brass, etc.) For example, such can be the case when the pump 10 is being utilized to pump difficult-to-pump materials. Such difficult-to-pump materials include, without limitation, Liquid Sand® (available from Halliburton Energy Services) or the like, or diverter materials, such as, for example, fluids comprising poly lactic acid (PLA) fibers and/or large PLA particles.

In embodiments, in the assembled configuration of valve poppet assembly 100, the poppet insert retainer 102 is threadably coupled with the valve stem 103. In such embodiments, at least a portion of valve stem contact surface 102C of poppet insert retainer 102 and at least a portion of poppet insert retainer contact surface 103C of valve stem 103 comprise threadable threads.

In embodiments, valve poppet assembly 100 further comprises a support 105, Support 105 can be an integral part (e.g., a shoulder) of valve stem 103. Alternatively, support 105 can be a disparate component (e.g., a separable cylindrical ring that may be connected to valve stem 103 by threads) of valve poppet assembly 100, Support 105 is operable to retain poppet seat 101, preventing poppet seat 101 from moving along central axis 17A in direction 121 beyond the distance allowed by support 105. In embodiments, valve stein 103 has a smaller diameter in a smaller diameter portion P1 within and above support 105 than a diameter thereof in a larger diameter portion P2 below support 105, and support 105 comprises a ring of material (e.g., softer steel material) having an inside diameter less than the diameter of the larger diameter portion P2 of valve stem 103 below support 105, whereby support 105 (e.g., a cylindrical ring) is retained on valve stem 103 by a shoulder formed at the intersection of smaller diameter portion P1 and larger diameter portion P2, This support 105 can be utilized to reduce local stresses on the (e.g., harder material) poppet seat 101. Although described as a diameter, valve stem 103 can have a cross-sectional shape other than round, such as and without limitation, square or oval, in embodiments.

In embodiments, valve poppet assembly 100 further comprises an o-ring or seal 106 configured to prevent leakage through the components of valve poppet assembly 100.

In embodiments, a valve poppet assembly 100 of this disclosure comprises: a valve stem 103; a cylindrical poppet insert retainer 102; a cylindrical poppet seat 101; and optionally a poppet insert 104 positioned along an outside circumference C1 of the poppet seat 101 and extending a distance D1 between a front surface 101' of the poppet seat 101 and a back surface 102" of the poppet insert retainer 102. In an assembled configuration of such a valve poppet assembly 100, the valve stem 103 can extend along a central axis 17A through the poppet insert retainer 102, the poppet seat 101 can be threadably coupled with the poppet insert retainer 102, and a poppet seat contact surface 102A of the poppet insert retainer 102 can contact a poppet insert retainer contact surface 101A of the poppet seat 101. As noted above, according to this disclosure, the valve stem 103, the poppet insert retainer 102, and the poppet seat 101 are not a single, integral component. As noted above, according to this disclosure, the valve stem 103, the poppet insert retainer 102, and the poppet seat 101 comprise two or three separable components. As noted above, the poppet insert 104 can be made of metal, in embodiments. In some such embodiments, the poppet insert 104 and the poppet seat 101 can be made as one single construction (e.g., can be integrated), comprising a same softer metal.

As noted above, in embodiments, the valve stem 103 and/or the valve insert retainer 102 have a hardness, as measured using hardness tests known to those of skill in the art, which is less than a hardness of the valve seat 101. (Numerous hardness testing methods will be known to those of skill in the art. Without limitation, such hardness tests include Rockwell, Knoop-Vickers, Brinell, and the like. Without limitation, such hardness testing can performed according to ASTM E10, ASTM E18, ISO 6506-1, and the like.) In embodiments, the poppet seat 101 comprises a carburized surface and/or comprises a carbide, and the poppet insert retainer 102 and/or the valve stem 103 do not comprise a carburized surface and/or do not comprise a carbide (e.g., may comprise regular, non-carburized steel).

Also disclosed herein is a pump fluid end 22 comprising a valve poppet assembly 100 as described herein. Such a pump fluid end 22 comprises a reciprocating element 18 disposed at least partially within a reciprocating element bore 24 of the pump fluid end 22, a discharge valve assembly 72, and a suction valve assembly 56, wherein the discharge valve assembly 72 and/or the suction valve assembly 56 comprises a poppet valve assembly 100, as detailed herein, and a valve seat 80.

The pump fluid end 22 can be a cross-bore pump fluid end 22 such as depicted in FIG. 2A and FIG. 2B or a concentric bore pump fluid end 22 such as depicted in FIG. 3.

In embodiments, suction valve assembly 56 comprises a valve poppet assembly 100 of this disclosure and a valve seat 80 comprising a suction valve seat. In such embodiments, a valve seat housing 90 can comprise a suction valve seat housing. In some such embodiments, pump fluid end 22 is a concentric bore pump fluid end 22 such as depicted in FIG. 3 or a tee-bore pump fluid end 22 such as depicted in FIG. 2B, and the suction valve seat housing 90 comprises an inside surface of reciprocating element 18 or a component (e.g., a valve seat adapter) coupled therewith. In other such embodiments, pump fluid end 22 is a cross-bore pump fluid end 22 such as depicted in FIG. 2A, and the suction valve seat housing 90 comprises an inside surface of cross-bore 25 or a component (e.g., a valve seat adapter) coupled therewith.

In embodiments, discharge valve assembly 72 comprises a valve poppet assembly 100 of this disclosure and valve seat 80 comprises a discharge valve seat. In some such embodiments, pump fluid end 22 is a concentric bore pump fluid end 22 such as depicted in FIG. 3, and the discharge valve seat housing 90 comprises an inside surface of reciprocating element bore 24 and/or pump chamber 28 or a component (e.g., a valve seat adapter) coupled therewith. In other such embodiments, pump fluid end 22 is a cross-bore pump fluid end 22 such as depicted in FIG. 2A and FIG. 2B, and the discharge valve seat housing 90 comprises an inside surface of cross-bore 25 or a component (e.g., a valve seat adapter) coupled therewith.

During operation of valve assembly 110, valve poppet assembly 100 moves away from valve seat 80 when valve assembly 110 is opening, and valve poppet assembly 100 moves toward valve seat 80 when valve assembly 110 is closing. When in a fully closed configuration of valve assembly 110, poppet seat contact surface 80A of valve seat 80 contacts valve seat contact surface 101B of poppet seat 101, and, when poppet insert 104 is present, poppet insert contact surface 80B of valve seat 80 contacts valve seat contact surface 104B of poppet insert 104. When in a partially or fully open configuration of valve assembly 110, poppet seat contact surface 80A of valve seat 80 does not contact or does not fully contact valve seat contact surface 101B of poppet seat 101, and, when poppet insert 104 is present, poppet insert contact surface 80B of valve seat 80 does not contact or does not fully contact valve seat contact surface 104B of poppet insert 104. In the fully open configuration of valve assembly 110, poppet seat contact surface 80A of valve seat 80 is separated from valve seat contact surface 101B of poppet seat 101 by an opening distance, and, when poppet insert 104 is present, poppet insert contact surface 80B of valve seat 80 is separated from valve seat contact surface 104B of poppet insert 104 by a distance that can be substantially equal to, less than or greater than the opening distance between the poppet seat contact surface 80A of valve seat 80 and the valve seat contact surface 101B of poppet seat 101.

In embodiments, suction valve assembly 56 and/or discharge valve assembly 72 (which can be a valve assembly 110 comprising a poppet valve assembly 100 as disclosed herein or can be a disparate valve assembly) comprises a valve assembly having a valve guide, as described, for example, in U.S. patent application Ser. No. 16/411,910 filed May 14, 2019, which is entitled "Valve Assembly for a Fluid End with Limited Access", the disclosure of which is hereby incorporated herein in its entirety for purposes not contrary to this disclosure. In such embodiments, the suction valve body and/or the discharge valve body of the suction valve assembly 56 and/or the discharge valve assembly 72, respectively, comprises a poppet assembly 100 of this disclosure.

In embodiments, pump fluid end 22 comprises a packing assembly, such that packing 29, a packing carrier, and a packing screw can be removed from back S2 of pump fluid end 22 when crankshaft 16 is at TDC, as described, for example, in U.S. patent application Ser. No. 16/411,911 filed May 14, 2019, which is entitled "Pump Fluid End with Positional Indifference for Maintenance", the disclosure of which is hereby incorporated herein in its entirety for purposes not contrary to this disclosure.

In embodiments, pump fluid end 22 comprises a suction valve stop for assisting closure of suction valve assembly 56 (which can be a suction valve assembly 110 comprising a suction valve seat 80 and a valve poppet assembly 100 of this disclosure or can be a disparate suction valve assembly 56), as described, for example, in U.S. patent application Ser. No. 16/436,312 filed Jun. 10, 2019, which is entitled "Pump Fluid End with Suction Valve Closure Assist", the disclosure of which is hereby incorporated herein in its entirety for purposes not contrary to this disclosure.

Further disclosed herein is a pump comprising: a pump fluid end 22 and a pump power end 12, as described hereinabove. In such embodiments, the pump fluid end 22 comprises: a reciprocating element 18 disposed at least partially within a reciprocating element bore 24 of the pump fluid end 22, a discharge valve assembly 72, and a suction valve assembly 56. In such embodiments, the discharge valve assembly 72 and/or the suction valve assembly 56 comprises a valve seat 80 and a valve poppet assembly 100 of this disclosure, as described hereinabove. As described hereinabove with reference to FIG. 4, the pump power end 12 is operable to reciprocate the reciprocating element 18 within the reciprocating element bore 24 of the pump fluid end 22.

In embodiments, pump 10 of this disclosure is a concentric bore pump fluid end 22 such as depicted in FIG. 3 or a cross-bore pump fluid end such as depicted in FIG. 2A and FIG. 2B. In embodiments, pump fluid end 22 comprises a reciprocating element 18 having suction valve assembly 56 (which can be a valve assembly 110 comprising a valve poppet assembly 100 of this disclosure or a disparate valve assembly), such as the cross-bore (e.g., T-bore) pump fluid end 22 of FIG. 2B and the concentric bore pump fluid end 22 of FIG. 3. In some such embodiments, pump 10 further comprises a flexible manifold, as described, for example, in U.S. patent application Ser. No. 16/411,901 filed May 14, 2019, which is entitled "Flexible Manifold for Reciprocating Pump", the disclosure of which is hereby incorporated herein in its entirety for purposes not contrary to this disclosure.

As noted above, in embodiments the discharge valve assembly 72 comprises the valve poppet assembly 100 of this disclosure, and the valve seat 80 is a discharge valve seat 80. In embodiments, the suction valve assembly 56 comprises the valve poppet assembly 100 of this disclosure, and the valve seat 80 is a suction valve seat 80. In embodiments, the suction valve assembly 56 and the discharge valve assembly 72 comprise a valve poppet assembly 100 of this disclosure, with a corresponding the suction valve seat 80 and discharge valve seat 80.

In embodiments, a discharge valve seat of discharge valve assembly 72 (which can be a discharge valve seat 80 of a valve assembly 110 comprising a valve poppet assembly 100 of this disclosure or can be a disparate discharge valve seat) and/or a suction valve seat of suction valve assembly 56 (which can be a suction valve seat 80 of a valve assembly 110 comprising a valve poppet assembly 100 of this disclosure or can be a disparate suction valve seat) is a valve seat with supplemental retention, as described, for example, in U.S. patent application Ser. No. 16/411,898 filed May 14, 2019, which is entitled "Pump Valve Seat with Supplemental Retention", the disclosure of which is hereby incorporated herein in its entirety for purposes not contrary to this disclosure.

In embodiments, suction valve assembly 56 of pump fluid end 22 (which can comprise a suction valve seat 80 and a valve poppet assembly 100 of this disclosure or a disparate suction valve assembly 56) comprises an easy access suction valve, as described, for example, in U.S. patent application Ser. No. 16/411,891 filed May 14, 2019, which is entitled "Pump Fluid End with Easy Access Suction Valve", the disclosure of which is hereby incorporated herein in its entirety for purposes not contrary to this disclosure.

In embodiments, reciprocating element 18 comprises tool engagement features on front 60 thereof, whereby reciprocating element 18 can be removed from pump fluid end 22 by engaging a tool with the engagement features, as described, for example, in U.S. patent application Ser. No. 16/411,905 filed May 14, 2019, which is entitled "Pump Plunger with Wrench Features", the disclosure of which is hereby incorporated herein in its entirety for purposes not contrary to this disclosure.

In embodiments, reciprocating element 18 is coupled with a pushrod 30 (or another component of mechanical linkages 4 (FIG. 4)) of pump power end 12 via a reciprocating element adapter, as described, for example, in U.S. patent application Ser. No. 16/411,894 filed May 14, 2019, which is entitled "Easy Change Pump Plunger", the disclosure of which is hereby incorporated herein in its entirety for purposes not contrary to this disclosure.

A pump 10 of this disclosure can comprises multi-layer surface coating disposed on reciprocating element 18 and/or a sleeve that provides cylindrical wall 26, as described, for example, in U.S. patent application Ser. No. 16/436,389 filed Jun. 10, 2019, which is entitled "Multi-Layer Coating for Plunger and/or Packing Sleeve", the disclosure of which is hereby incorporated herein in its entirety for purposes not contrary to this disclosure.

As noted hereinabove, a pump 10 of this disclosure can be a multiplex pump comprising a plurality of reciprocating elements 18, and a corresponding plurality of reciprocating element bores 24, suction valve assemblies 56, and discharge valve assemblies 72. The plurality can comprise any number such as, for example, 2, 3, 4, 5, 6, 7, or more. For example, in embodiments, pump 10 is a triplex pump, wherein the plurality comprises three. In alternative embodiments, pump 10 comprises a Quintuplex pump, wherein the plurality comprises five.

Also disclosed herein is a method of providing a valve poppet assembly 100 in an assembled configuration. The method comprises: providing a valve stem 103; providing a poppet insert retainer 102; providing a poppet seat 101; and assembling the valve stem 103, the poppet insert retainer 102, and the poppet seat 101 such that the valve stem 103 extends along a central axis 17A through the poppet insert retainer 102 and the poppet seat 101, and the poppet seat 101 is (e.g., threadably) coupled with the poppet insert retainer 102 such that a poppet seat contact surface 102A of the poppet insert retainer 102 contacts a poppet insert retainer contact surface 101A of the poppet seat 101. In embodiments, the method further comprises providing a support 105 and/or an o-ring 106, as described hereinabove, and assembling the valve poppet assembly 100 such that o-ring 106 is positioned such that it prevent any leakage through the valve poppet assembly 100 (e.g., along central axis 17A of valve stem 103 adjacent and/or proximate to valve stem 103. According to this disclosure, the valve stem 103, the poppet insert retainer 102, and the poppet seat 101 that are provided are not a single, integral component. In an aspect, the valve stem 103, the poppet insert retainer 102, the poppet seat 101, and/or the poppet insert 103 comprise two, three, or four separable components, not counting the o-ring 106 and support 105. For clarity, when assembled, valve poppet assembly 100 can be considered an integrated assembly (e.g., not a single integrated component), that can be disassembled into the two, three, or four separate components, respectively.

In embodiments, providing a poppet seat 101 further comprises providing a poppet seat 101 that has been independently subjected to a surface treatment. As utilized herein, 'independently subjected' indicates that the component (e.g., the poppet seat 101 in this case) has been subjected to the surface treatment in the absence of the other components (e.g., surface treated while not physically/mechanically coupled to the valve stem 103 and/or poppet insert retainer 102). For example, if a poppet seat 101 were subjected to a surface treatment while physically/mechanically coupled with a valve stem 103, the poppet seat 101 in this case would not be considered 'independently subjected' to a surface treatment (even if valve stem 103 were protected/masked from the surface treatment). In embodiments, one or more components of valve poppet assembly 100 other than poppet seat 101 (e.g., poppet insert retainer 102, valve stem 103, optional poppet insert 104, optional support (e.g., ring or shoulder) 105, and/or optional o-ring or seal 106) are not subjected to the same surface treatment to which poppet seat 101 is subjected or are not subjected to any surface treatment. By way of non-limiting example, in embodiments, providing poppet seat 101 comprises subjecting a poppet seat 101 to carburization to provide a carburized poppet seat 101, and providing a poppet insert retainer 104 comprises providing a poppet insert retainer that has not been subjected to carburization and/or providing a valve stem 103 comprises providing a valve stem 103 that has not been subjected to carburization.

In alternative or additional embodiments, providing a poppet seat 101 comprises providing a poppet seat 101 that is made of (e.g., comprises, consists of, or consists essentially of) a disparate base material than that of the poppet insert retainer 102 and/or the valve stem 103. For example and without limitation, in embodiments, a base material that poppet seat 101 comprises includes one or more carbides, while a base material that poppet insert retainer 102 and/or valve stem 103 comprises does not include the same one or more carbides and/or does not comprise one or more carbides at all. In some such embodiments, for example, poppet insert retainer 102 and/or valve stem 103 can comprise, for example and without limitation, (e.g., regular or non-carburized) steel.

In embodiments, assembling comprises positioning poppet seat 101 on valve stem 103, such that poppet seat contact surface 103D of valve stem 103 contacts valve stem contact surface 101D of poppet seat 101, and positioning poppet insert retainer 102 on valve stem 103 such that poppet insert retainer contact surface 103C of valve stem 103 contacts valve stem contact surface 102C of poppet insert retainer 102 and poppet seat contact surface 102A of poppet insert retainer 102 contacts poppet insert retainer contact surface 101A of poppet seat 101, In embodiments, at least a portion of poppet insert retainer contact surface 103C of valve stem 103 and at least a portion of valve stem contact surface 102C of poppet insert retainer 102 are ratably threaded have corresponding threads T), and positioning poppet insert retainer 102 on valve stem 103 such that poppet insert retainer contact surface 103C of valve stem 103 contacts valve stem contact surface 102C of poppet insert retainer 102 comprises threading poppet insert retainer 102 onto valve stem 103. In embodiments, positioning poppet seat 101 on valve stem 103 comprises passing valve stem 103 through a center of poppet seat 101 along central axis 17A of valve stem 103. In embodiments, positioning poppet insert retainer 102 on valve stem 103 comprises passing valve stem 103 through a center of poppet insert retainer 102 along central axis 17A of valve stem 103. In embodiments, positioning poppet seat 101 on valve stem 103 comprises positioning support 105 around valve stem 103, such that an outer diameter of valve stem 103 on larger outer diameter portion P2 of valve stem 103 below support 105 is greater than (and thus supports support 105) an outer diameter of smaller diameter portion P1 of valve stem 103 within and/or above support 105. Alternatively, positioning poppet seat 101 on valve stem 103 comprises positioning poppet seat 101 on support 105, wherein support 105 comprises a shoulder integral to valve stem 103 or a separate component such as a cylindrical ring that can be threaded onto or otherwise connected to valve stem 103. Thus, in embodiments, valve stem 103 comprises a shoulder that acts as support 105 (i.e., support 105 is an integral part of valve stem 103), and in alternative embodiments, valve stem 103 has larger outer diameter portion P2 and a smaller outer diameter portion P1, such that a disparate component comprising support 105 can be positioned on valve stem 103 via the smaller diameter portion P1 and pushed along valve stem 103 until the larger diameter portion P2 of valve stem 103 stops further movement of support 105 along valve stem 103 and supports support 105 thereon.

As noted hereinabove, in embodiments, valve poppet assembly 100 further comprises poppet insert 104. In such embodiments, assembling valve poppet assembly 100 can further comprise positioning poppet insert 104 such that poppet seat contact surface 104C of poppet insert 104 contacts poppet insert contact surface 101C of poppet seat 101. In embodiments, positioning of poppet insert 104 is effected after positioning of poppet seat 101 and/or prior to positioning of poppet insert retainer 102 on valve stem 103. After positioning poppet insert 104, poppet insert retainer 102 can be positioned such that poppet insert retainer contact surface 103C of valve stem 103 contacts valve stem contact surface 102C of poppet insert retainer 102, poppet seat contact surface 102A of poppet insert retainer 102 contacts poppet insert retainer contact surface 101A of poppet seat 101, and poppet insert contact surface 102B of poppet insert retainer 102 contacts poppet insert retainer contact surface 104A of poppet insert 104.

In embodiments, poppet insert 104 is positioned along an outside circumference C1 of the poppet seat 101. Although not intending to be limited by the specific shapes of the various components of valve poppet assembly 100 depicted in the embodiment of FIG. 5, in embodiments, poppet insert 104 comprises a shoulder S1 that extends a distance D1 between front surface 101' of poppet seat 101 and back surface 102" of the poppet insert retainer 102, and thus may form an inverted L-shaped cross section, as depicted in FIG. 5.

Following assembly of valve poppet insert 100, valve assembly 110 (which can have a normally closed position) can be assembled by positioning valve seat 80 within pump fluid end 22 and positioning valve poppet assembly 100 into the pump fluid end 22 such that poppet seat contact surface 80A of valve seat 80 contacts valve seat contact surface 101B of poppet seat 101. In embodiments comprising poppet insert 104, positioning valve poppet assembly 100 into the pump fluid end 22 further provides that poppet insert contact surface 80B of valve seat 80 contacts valve seat contact surface 104B of poppet insert 104. A spring can be used to bias the valve poppet assembly 100 into contact with the valve seat 80.

Design of valve poppet assembly 100 as disclosed herein can provide ease of maintenance of valve assembly 110. For example, poppet insert 104, which can optionally be designed to wear more rapidly than poppet seat 101, can be separated from valve poppet assembly 100 independently of valve stem 103 and/or poppet seat 101. As mentioned earlier, in embodiments, poppet insert 104 can be made of a less durable or less hard material (e.g., an elastomer, such as, without limitation urethane) than poppet seat 101 (which can be made, for example, of one or more carbides and/or have a carburized surface). In conventional (e.g., one-piece valve poppet assemblies, the poppet insert must be pried out or cut out from its tight enclosure; which can be difficult and/or time consuming. After removal of the insert, a new insert is stretched around the poppet seat, and the insert must be hammered in so that the intricate shape of the insert can be completely captured by the tight enclosure. Should the poppet insert be made from soft steel or even fiber re-enforced elastomers, stretching these type of inserts over the poppet seat of a conventional valve poppet assembly can be difficult or impossible. According to this disclosure, after pumping fluid for a time, should poppet insert 104 need replacement and/or repair, poppet insert retainer 102 can be decoupled from valve poppet assembly 100 (e.g., unthreaded from valve stem 103), which allows the poppet insert 104 to be removed from the valve assembly easily, even if the poppet inserts 104 (e.g., being removed and replaced) comprise metal(s). In such embodiments, a replacement or repaired poppet insert 104 can be positioned within valve poppet assembly 100 more easily than when utilizing a conventional (e.g., one piece) valve poppet assembly, such that poppet seat contact surface 104C of repaired or replacement poppet insert 104 contacts poppet insert contact surface 101C of poppet seat 101 and, poppet insert contact surface 80B of valve seat 80 contacts (or approaches) valve seat contact surface 104B of poppet insert 104. Subsequently, the or a replacement poppet insert retainer 102 can be reattached such that poppet insert retainer contact surface 103C of valve stem 103 contacts valve stem contact surface 102C of poppet insert retainer 102, poppet seat contact surface 102A of poppet insert retainer 102 contacts poppet insert retainer contact surface 101A of poppet seat 101, and poppet insert contact surface 101C of poppet seat 101 contacts poppet seat contact surface 104C of poppet insert 104. Thus, the or the replacement poppet insert retainer 102 can be reattached to the poppet seat 101, capturing poppet insert 104 without requiring stretching, prying, hammering or tapping. In embodiments, valve poppet assembly 100 provides for ease of installation of poppet insert 104. For example, poppet insert 104 can be positioned as described hereinabove and held in place by positioning of poppet insert retainer 102 thereupon (e.g., tightening or threading of poppet insert retainer 102 with valve stem 103). In embodiments, as mentioned earlier, no manual tapping of poppet insert 104 is required for installing/positioning poppet insert 104. Following this easy replacement process, the poppet assembly 100 can be reinstalled within the pump fluid end 22.

As will be appreciated by one of skill in the art with the help of this disclosure, a valve poppet assembly 100 as disclosed herein that allows for one or more components of the valve poppet assembly 100 (e.g., the poppet seat 101, the poppet insert retainer 102, and the valve stem 103) to comprise a disparate base material and/or a disparate surface material than at least one other of the components of the valve poppet assembly 100 (e.g., the poppet seat 101, the poppet insert retainer 102, and the valve stem 103) provides flexibility and enables design of each individual component to have desired mechanical properties (e.g., hardness, brittleness, flexibility, etc.), commensurate to the (e.g., unique) purpose of the individual component.

Figure 6:
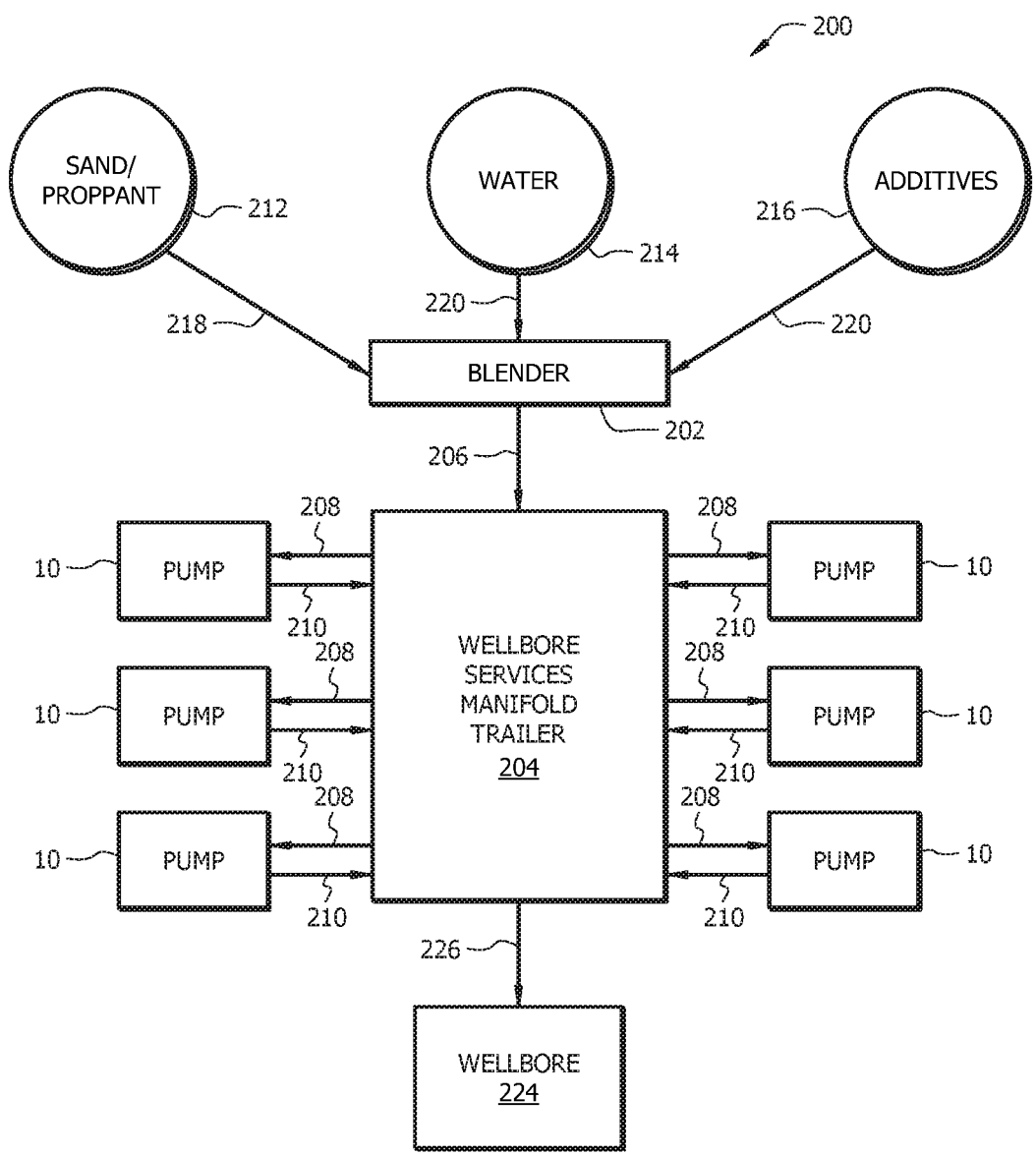
FIG. 6 is a schematic representation of an embodiment of a wellbore servicing system, according to embodiments of this disclosure.

Also disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 6, which is a schematic representation of an embodiment of a wellbore servicing system 200, according to embodiments of this disclosure.

A method of servicing a wellbore 224 according to this disclosure comprises: fluidly coupling a pump 10 of this disclosure to a source of a wellbore servicing fluid and to the wellbore; and communicating wellbore servicing fluid into the wellbore via the pump 10. As detailed hereinabove, the pump 10 of this disclosure comprises a pump fluid end 22 and a pump power end 12. The pump fluid end 22 can be a pump fluid end 22 as described herein comprising a valve poppet assembly 100 of this disclosure. Pump fluid end 22 can comprise: a reciprocating element 18 disposed at least partially within a reciprocating element bore 24 of the pump fluid end 22; a discharge valve assembly 72; and a suction valve assembly 56. The pump power end 12 can be a pump power end 12 as described herein, and is operable to reciprocate the reciprocating element 18 within the reciprocating element bore 24 of the pump fluid end 22.

The discharge valve assembly 72 and/or the suction valve assembly 56 comprise a valve seat 80 and a valve poppet assembly 100 of this disclosure. As detailed hereinabove, the valve poppet assembly 100 comprises: a valve stem 103; a poppet insert retainer 102; and a poppet seat 101. In an assembled configuration of the valve poppet assembly 100, the valve stem 103 extends along a central axis 17A through the poppet insert retainer 102 and the poppet seat 101. According to this disclosure, the valve stem 103, the poppet insert retainer 102, and the poppet seat 101 are not a single, integral component.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, diverter fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, well abandonment processes, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition. In some embodiments, water may be substituted by acids, such as hydrochloric acids or hydrofluoric acids; with acid concentrations that are low (like 4%) to very high (above 30%). Water could be gelled using various gelling agents or even plugging agents. Fuels, such as diesel or produced gas can also used as treatment fluid, in embodiments.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 3,000 psi, 5,000 psi, 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. In embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. In embodiments, each of one or more pumps 10 discharge wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. For instance, the herein disclosed fluid end design 22 comprising a valve poppet assembly 100 comprising a poppet seat 101, a poppet insert retainer 102, and a valve stem 103 that are not a single, integrated component (i.e., wherein at least one of the three main components (i.e., the poppet seat 101, the poppet insert retainer 102, and the valve stem 103) is separable from at least one other of the three main components) enables at least one of the three main components to comprise, consist, or consist essentially of a disparate base material and/or a disparate surface material than at least one other of the three main components. The use of disparate surface and/or base materials for at least two of the three main components allows for providing a desired mechanical property (e.g., hardness and/or flexibility) to each of the components of the valve poppet assembly 100. For example, a component can be designed for an expected loading thereon during operation. Such a valve poppet assembly 100 may increase a lifetime and/or reliability (e.g., reduce a frequency of needed repair and/or replacement) by at least 10, 20, 30, 40, or 50% relative to a pump fluid end 22 not comprising the valve poppet assembly 100 (e.g., relative to a pump fluid end 22 comprising a valve poppet assembly wherein the main components (e.g., poppet seat 101, poppet insert retainer 102, and valve stem 103) are a single, integrated component, for example cast from molten metal placed into a common mold). Conventional one-piece poppets (e.g., comprising the poppet seat 101, poppet insert retainer 102, and valve stem 103 as a single, integrated component) do not provide such flexibility. For example, carburization of conventional one-piece poppets can result in inadvertent carburization of the valve stem and/or the use of one base material, such as carbide, for a conventional one-piece poppet, can result in breaking of the valve stem or other component of the valve poppet assembly during operation. The disclosed valve poppet assembly 100 can provide enhanced life expectancy by enabling the use of different base materials and/or surface materials (e.g., surface treatments) for one or more components (e.g., poppet seat 101, poppet insert retainer 102, valve stem 103) of the valve poppet assembly 100.

ADDITIONAL DISCLOSURE

The following are non-limiting, specific embodiments in accordance with the present disclosure:

Embodiment A: A valve poppet assembly comprising: a valve stem; a poppet insert retainer; and a poppet seat, wherein, in an assembled configuration, the valve stem extends along a central axis through the poppet insert retainer and the poppet seat, and wherein the valve stem, the poppet insert retainer, and the poppet seat are not a single, integral component.

Embodiment B: The valve poppet assembly of Embodiment A, wherein the valve stem and the poppet insert retainer are a single integral component, separable from the poppet seat.

Embodiment C: The valve poppet assembly of Embodiment A, wherein the valve stem and the poppet seat are a single integral component, separable from the poppet insert retainer.

Embodiment D: The valve poppet assembly of Embodiment A, wherein the poppet seat and the poppet insert retainer are a single integral component, separable from the valve stem.

Embodiment E: The valve poppet assembly of Embodiment A, wherein the poppet seat, the poppet insert retainer, and the valve stem are separable.

Embodiment F: The valve poppet assembly of any of Embodiment A through Embodiment E, wherein at least two components selected from the group consisting of the valve stem, the poppet insert retainer, and the poppet seat comprise a disparate base material.

Embodiment G: The valve poppet assembly of any of Embodiment A through Embodiment G, wherein at least one component selected from the group consisting of the valve stem, the poppet insert retainer, and the poppet seat comprises carbide.

Embodiment H: The valve poppet assembly of Embodiment G, wherein the at least one component selected from the group consisting of the valve stem, the poppet insert retainer, and the poppet seat that comprises carbide is the poppet seat.

Embodiment I: The valve poppet assembly of Embodiment G or Embodiment H, wherein at least one other component selected from the group consisting of the valve stem, the poppet insert retainer, and the poppet seat comprises steel.

Embodiment J: The valve poppet assembly of Embodiment I, wherein the at least one other component selected from the group consisting of the valve stem, the poppet insert retainer, and the poppet seat that comprises steel is the valve stem.

Embodiment K: The valve poppet assembly of any of Embodiment A through Embodiment J, wherein at least two components selected from the group consisting of the valve stem, the poppet insert retainer, and the poppet seat comprise a disparate surface material.

Embodiment L: The valve poppet assembly of any of Embodiment A through Embodiment K, wherein at least one component selected from the group consisting of the valve stem, the poppet insert retainer, and the poppet seat comprises a carburized surface.

Embodiment M: The valve poppet assembly of Embodiment L, wherein the at least one component selected from the group consisting of the valve stem, the poppet insert retainer, and the poppet seat that comprises the carburized surface is the poppet seat.

Embodiment N: The valve poppet assembly of Embodiment L or Embodiment M, wherein at least one other component selected from the group consisting of the valve stem, the poppet insert retainer, and the poppet seat comprises steel.

Embodiment O: The valve poppet assembly of Embodiment N, wherein the at least one other component selected from the group consisting of the valve stem, the poppet insert retainer, and the poppet seat that comprises steel is the valve stem.

Embodiment P: The valve poppet assembly of any of Embodiment A through Embodiment O further comprising an insert positioned along an outside circumference of the poppet seat and extending a distance between a front surface of the poppet seat and a back surface of the poppet insert retainer.

Embodiment Q: The valve poppet assembly of Embodiment P, wherein the insert comprises an elastomeric material.

Embodiment R: The valve poppet assembly of Embodiment P or Embodiment Q, wherein the poppet insert retainer is separable from the poppet seat and/or the valve stem, whereby the poppet insert retainer can be removed from the valve poppet assembly separately from the poppet seat and/or the valve stem, thus facilitating access to the insert.

Embodiment S: The valve poppet assembly of any of Embodiment A through Embodiment R, wherein, in the assembled configuration, the poppet insert retainer is threadably coupled with the valve stem.

Embodiment T: A pump fluid end comprising: a reciprocating element disposed at least partially within a reciprocating element bore of the pump fluid end; a discharge valve assembly; and a suction valve assembly, wherein the discharge valve assembly and/or the suction valve assembly comprises a poppet valve assembly of any of Embodiment A through Embodiment S and a valve seat.

Embodiment U: The pump fluid end of Embodiment T, wherein the pump fluid end is a concentric bore pump fluid end or a cross-bore pump fluid end.

Embodiment V: A pump comprising: a pump fluid end and a pump power end, wherein the pump fluid end comprises: a reciprocating element disposed at least partially within a reciprocating element bore of the pump fluid end; a discharge valve assembly; and a suction valve assembly, wherein the discharge valve assembly and/or the suction valve assembly comprises a valve seat and a valve poppet assembly, wherein the valve poppet assembly comprises: a valve stem; a poppet insert retainer; and a poppet seat, wherein, in an assembled configuration of the valve poppet assembly, the valve stem extends along a central axis through the poppet insert retainer and the poppet seat, and wherein the valve stem, the poppet insert retainer, and the poppet seat are not a single, integral component; and wherein the pump power end is operable to reciprocate the reciprocating element within the reciprocating element bore of the pump fluid end.

Embodiment W: The pump of Embodiment V, wherein the pump fluid end is a concentric bore pump fluid end or a cross-bore (e.g., a multi-bore) pump fluid end.

Embodiment X: The pump of Embodiment V or Embodiment W, wherein the discharge valve assembly comprises the valve poppet assembly, and wherein the valve seat comprises a discharge valve seat.

Embodiment Y: The pump of any of Embodiment V through Embodiment X, wherein the suction valve assembly comprises the valve poppet assembly, and wherein the valve seat comprises a suction valve seat.

Embodiment Z1: A method of servicing a wellbore, the method comprising: fluidly coupling a pump to a source of a wellbore servicing fluid and to the wellbore; and communicating wellbore servicing fluid into the wellbore via the pump, wherein the pump comprises a pump fluid end and a pump power end, wherein the pump fluid end comprises: a reciprocating element disposed at least partially within a reciprocating element bore of the pump fluid end; a discharge valve assembly; and a suction valve assembly, wherein the discharge valve assembly and/or the suction valve assembly comprises a valve seat and a valve poppet assembly, wherein the valve poppet assembly comprises: a valve stem; a poppet insert retainer; and a poppet seat, wherein, in an assembled configuration of the valve poppet assembly, the valve stem extends along a central axis through the poppet insert retainer and the poppet seat, and wherein the valve stem, the poppet insert retainer, and the poppet seat are not a single, integral component; and wherein the pump power end is operable to reciprocate the reciprocating element within the reciprocating element bore of the pump fluid end.

Embodiment Z2: The method of Embodiment Z1, wherein the wellbore servicing fluid comprise a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

Embodiment Z3: The method of Embodiment Z1 or Embodiment Z2, wherein the pump operates during the pumping of the wellbore servicing fluid at a pressure of greater than or equal to about 3,000 psi, 5,000 psi, 10,000 psi, 20,000 psi, 30,000 psi, 40,000 psi, or 50,000 psi.

Embodiment Z4: The method of any of Embodiment Z1 through Embodiment Z3, wherein the pump operates during the pumping of the wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Embodiment Z5: A valve poppet assembly comprising: a valve stem; a cylindrical poppet insert retainer; a cylindrical poppet seat; and optionally an insert positioned along an outside circumference of the poppet seat and extending a distance between a front surface of the poppet seat and a back surface of the poppet insert retainer, wherein, in an assembled configuration, the valve stem extends along a central axis through the poppet insert retainer, the poppet seat is threadably coupled with the poppet insert retainer, and a poppet seat contact surface of the poppet insert retainer contacts a poppet insert retainer contact surface of the poppet seat, and wherein the valve stem, the poppet insert retainer, and the poppet seat are not a single, integral component.

Embodiment Z6: The valve poppet assembly of Embodiment Z5, wherein the valve stem and/or the valve insert retainer have a hardness that is less than a hardness of the valve seat.

Embodiment Z7: The valve poppet assembly of Embodiment Z5 or Embodiment Z6, wherein the poppet seat comprises a carburized surface and/or comprises a carbide, and wherein the poppet insert retainer and/or the valve stem does not comprise a carburized surface and/or does not comprise a carbide.

Embodiment Z8: A valve poppet assembly (e.g., the valve poppet assembly of any of Embodiment Z5 through Embodiment Z7), comprising an (the) insert, wherein the insert comprises a non-stretchable material.

Embodiment Z9: The valve poppet assembly of Embodiment Z8, wherein the non-stretchable material comprises a metal or a fiber reinforced material.

Embodiment Z10: The valve poppet assembly of Embodiment Z9, wherein the poppet seat is separable from the poppet insert retainer to facilitate assembling of the valve poppet assembly into the assembled configuration.

Embodiment Z11: A method of providing a valve poppet assembly in an assembled configuration, the method comprising: providing a valve stem; providing a poppet insert retainer; providing a poppet seat that has been independently subjected to a surface treatment, wherein the valve stem, the poppet insert retainer, and the poppet seat are not a single, integral component; and assembling the valve stem, the poppet insert retainer, and the poppet seat such that the valve stem extends along a central axis through the poppet insert retainer and the poppet seat, and the poppet seat is threadably coupled with the poppet insert retainer such that a poppet seat contact surface of the poppet insert retainer contacts a poppet insert retainer contact surface of the poppet seat.

Embodiment Z12: The method of Embodiment Z11, wherein providing the poppet seat that has been independently subjected to the surface treatment further comprises carburizing the poppet seat.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A valve poppet assembly comprising:
a valve stem;
a poppet insert retainer; and
a poppet seat,
wherein, in an assembled configuration: the valve stem extends along a central axis through the poppet insert retainer and the poppet seat, the valve stem and the poppet seat are separable, and the poppet seat is coupled with the poppet insert retainer such that a poppet seat contact surface of the poppet insert retainer contacts a poppet insert retainer contact surface of the poppet seat, and
wherein the valve poppet assembly is configured such that, during operation of a valve assembly comprising the valve poppet assembly and a valve seat, the valve poppet assembly moves away from the valve seat when the valve assembly is opening, and the valve poppet assembly moves toward the valve seat when the valve assembly is closing.

2. The valve poppet assembly of claim 1:
wherein the valve stem and the poppet insert retainer are a single integral component, separable from the poppet seat; or
wherein the poppet seat and the poppet insert retainer are a single integral component, separable from the valve stem; or
wherein the poppet seat, the poppet insert retainer, and the valve stem are separable.

3. The valve poppet assembly of claim 1, wherein at least two components selected from the group consisting of the valve stem, the poppet insert retainer and the poppet seat comprise a disparate base material.

4. The valve poppet assembly of claim 3, wherein at least one component selected from the group consisting of the valve stem, the poppet insert retainer, and the poppet seat comprises carbide.

5. The valve poppet assembly of claim 4, wherein the at least one component selected from the group consisting of the valve stem, the poppet insert retainer, and the poppet seat that comprises carbide is the poppet seat.

6. The valve poppet assembly of claim 4, wherein at least one other component selected from the group consisting of the valve stem, the poppet insert retainer, and the poppet seat comprises steel.

7. The valve poppet assembly of claim 1, wherein at least one component selected from the group consisting of the valve stem, the poppet insert retainer, and the poppet seat comprises a carburized surface.

8. The valve poppet assembly of claim 7, wherein at least one other component selected from the group consisting of the valve stem, the poppet insert retainer, and the poppet seat comprises steel.

9. The valve poppet assembly of claim 1 further comprising an insert positioned along an outside circumference of the poppet seat and extending a distance between a front surface of the poppet seat and a back surface of the poppet insert retainer.

10. The valve poppet assembly of claim 9, wherein the insert comprises an elastomeric material.

11. The valve poppet assembly of claim 9, wherein the poppet insert retainer is separable from the poppet seat and/or the valve stem, whereby the poppet insert retainer can be removed from the valve poppet assembly separately from the poppet seat and/or the valve stem, thus facilitating access to the insert.

12. The valve poppet assembly of claim 1, wherein, in the assembled configuration, a valve stem contact surface of the poppet insert retainer contacts a poppet insert retainer contact surface of the valve stem, and the poppet insert retainer is threadably coupled with the valve stem.

13. A pump comprising:
a pump fluid end and a pump power end,
wherein the pump fluid end comprises:
a reciprocating element disposed at least partially within a reciprocating element bore of the pump fluid end;

a discharge valve assembly; and a suction valve assembly, wherein the discharge valve assembly and/or the suction valve assembly comprises a valve seat and the valve poppet assembly of claim 1; and wherein the pump power end is operable to reciprocate the reciprocating element within the reciprocating element bore of the pump fluid end.

14. The pump of claim 13, wherein the pump fluid end is a concentric bore pump fluid end or a cross-bore pump fluid end.

15. The pump of claim 13, wherein the discharge valve assembly comprises the valve poppet assembly, and wherein the valve seat comprises a discharge valve seat.

16. The pump of claim 13, wherein the suction valve assembly comprises the valve poppet assembly, and wherein the valve seat comprises a suction valve seat.

17. A method of servicing a wellbore, the method comprising:

fluidly coupling a pump to a source of a wellbore servicing fluid and to the wellbore; and communicating wellbore servicing fluid into the wellbore via the pump, wherein the pump comprises a pump fluid end and a pump power end, wherein the pump fluid end comprises:

a reciprocating element disposed at least partially within a reciprocating element bore of the pump fluid end;

a discharge valve assembly; and a suction valve assembly, wherein the discharge valve assembly and/or the suction valve assembly comprises a valve seat and the valve poppet assembly of claim 1; and wherein the pump power end is operable to reciprocate the reciprocating element within the reciprocating element bore of the pump fluid end.

18. The method of claim 17, wherein the wellbore servicing fluid comprise a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

19. The method of claim 17, wherein the pump operates during the pumping of the wellbore servicing fluid at a pressure of greater than or equal to about 3,000 psi, 5,000 psi, 10,000 psi, 20,000 psi, 30,000 psi, 40,000 psi, or 50,000 psi.

20. The method of claim 17 wherein the pump operates during the pumping of the wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

21. A valve poppet assembly comprising:

a valve stem;

a poppet insert retainer; and a poppet seat, wherein, in an assembled configuration: the valve stem extends along a central axis through the poppet insert retainer and the poppet seat, a valve stem contact surface of the poppet insert retainer contacts a poppet insert retainer contact surface of the valve stem, the valve stem is threadably coupled with the poppet insert retainer, the poppet seat is coupled with the poppet insert retainer such that a poppet seat contact surface of the poppet insert retainer contacts a poppet insert retainer contact surface of the poppet seat, and the valve stem, the poppet insert retainer, and the poppet seat are separable, and wherein the valve poppet assembly is configured such that, during operation of a valve assembly comprising the valve poppet assembly and a valve seat, the valve poppet assembly moves away from the valve seat when the valve assembly is opening, and the valve poppet assembly moves toward the valve seat when the valve assembly is closing.

\* \* \* \* \*